United States Patent
Morein

(10) Patent No.: US 6,903,739 B2
(45) Date of Patent: Jun. 7, 2005

(54) GRAPHIC DISPLAY SYSTEM HAVING A FRAME BUFFER WITH FIRST AND SECOND MEMORY PORTIONS

(75) Inventor: Stephen L. Morein, Cambridge, MA (US)

(73) Assignee: ATI International SRL, Christchurch (BB)

(*) Notice: Subject to any disclaimer, the term of this patent is extended or adjusted under 35 U.S.C. 154(b) by 357 days.

(21) Appl. No.: 09/789,074

(22) Filed: Feb. 20, 2001

(65) Prior Publication Data

US 2002/0113786 A1 Aug. 22, 2002

(51) Int. Cl.[7] .............................................. G06T 15/40
(52) U.S. Cl. ....................... 345/422; 345/421; 345/581
(58) Field of Search .................................. 345/419, 420, 345/421, 422, 619, 581, 589

(56) References Cited

U.S. PATENT DOCUMENTS 6,498,606 B1 * 12/2002 Penna et al. ................. 345/422
6,720,964 B1 * 4/2004 Fowler et al. ............... 345/422

OTHER PUBLICATIONS

Deering, Michael F., et al.; FBRAM: A new Form of Memory Optimized for 3D Graphics; 1994; pp. 1–16.

* cited by examiner

Primary Examiner—Phu K. Nguyen
(74) Attorney, Agent, or Firm—Vedder, Price, Kaufman & Kammholz, P.C.

(57) ABSTRACT

A graphics display system has a graphics processor system for forming a color image on a display, the display being composed of an array of pixels. A memory system has a first memory for storing at least respective color data and respective Z data that is render from primitives of the image, and a second memory for storing respective display data, derived from the rendered color data and Z data, for each of the pixels. The graphics processor system has a memory interface operatively connected to the first and second memories. During formation of an image frame, the memory interface writes to and reads from a Z buffer, and only writes to a render target color buffer. After the image is rendered, image data is copied from the first memory to the second memory from which the image is displayed.

27 Claims, 3 Drawing Sheets

GRAPHIC DISPLAY SYSTEM HAVING A FRAME BUFFER WITH FIRST AND SECOND MEMORY PORTIONS

FIELD OF THE INVENTION

The invention relates in general to graphic display systems, and more particularly to a frame buffer memory for such systems.

BACKGROUND OF THE INVENTION

A typical display system in a computer system has a graphics controller, a frame buffer memory, a display controller and a system controller. The graphics controller may include multiple processors and a frame buffer memory interface coupled to a common bus. The processors may include a display controller, graphics accelerator, system interface and video processor. The processors are coupled to the frame buffer memory through the memory interface. The frame buffer memory is constructed using a DRAM array and has a capacity to store pixel data for at least one frame of a video display image. The processors and memory interface are usually integrated on a single chip. The performance of such a display system is usually limited by the bandwidth of the frame buffer memory.

In the literature a "unified memory system" usually refers to the graphics memory being integrated with the system memory. A better term here is a "unified graphics memory". One prior art computer system uses a unified graphics memory system, which contains two color buffers. One of the color buffers is a display buffer and the other is a render target buffer. There also may be a Z buffer. All buffers are stored in a common memory. This results in significant cost since the memory must have a high bandwidth. Another prior art computer system uses a separate memory for each type of buffer, that is a front buffer memory, a back buffer memory, a texture buffer memory and a Z buffer memory, for example. Such a prior art system has increased complexity, and less flexibility, especially in tradeoffs between the bandwidth needed for color vs. the bandwidth needed for Z values.

In historical systems the display refresh was the largest user of bandwidth, and there are prior art methods that increase the available bandwidth in a single memory (dual port VRAM). These systems were characterized by high resolution, but very low update rates "interactive" graphics of as many as 10 frame per second, but more likely several seconds per frame. Modern real-time graphics systems have applications where the update rate of the screen is close to the refresh rate of the monitor, furthermore each pixel on the render target may be drawn several times as layers of the image are drawn. For these applications, that now are the majority of the applications for computer graphics hardware, the refresh bandwidth is a fraction of the rendering bandwidth.

The use of either one common memory or a separate memory for each buffer are drawbacks of the prior art that result in inefficient operation and/or costly implementations of the computer systems

DETAILED DESCRIPTION OF A PREFERRED EMBODIMENT OF THE INVENTION

The present invention is a graphics display system having a graphics processor system for forming a color image on a display, the display being composed of an array of pixels. A memory system has a first memory for storing at least respective color data and respective z data for each of the pixels. The second memory stores respective display data for each of the pixels. The graphics processor system has a memory interface operatively connected to the first and second memories. In one embodiment, the first memory is a logic enhanced DRAM memory having render backend logic, and the second memory is a conventional DRAM memory.

The first and second memories of the memory system can be integrated on separate chips. The graphics processor can also be integrated on a further separate chip. Alternatively, all three of the graphics processor and the first and second memories can be integrated onto a common chip. Furthermore, the graphics processor and the first memory can be integrated onto a first chip, with the second memory being integrated on a separate second chip. In addition, the memory interface can be integrated on a separate chip from the graphics processor chip.

During formation of a frame in the frame buffer, the memory interface writes to and reads from the z buffer, and reads and writes to the back buffer, however writes are somewhat more common that reads to the color back buffer. In general, the bandwidth demands are highest on the z buffer, second highest on the back buffer, and lowest on the front buffer. In historical systems, where the rendering processor was of low speed, the front buffer refresh may have been the highest bandwidth demand, but this in no longer true for modern graphics applications.

Figure 1:
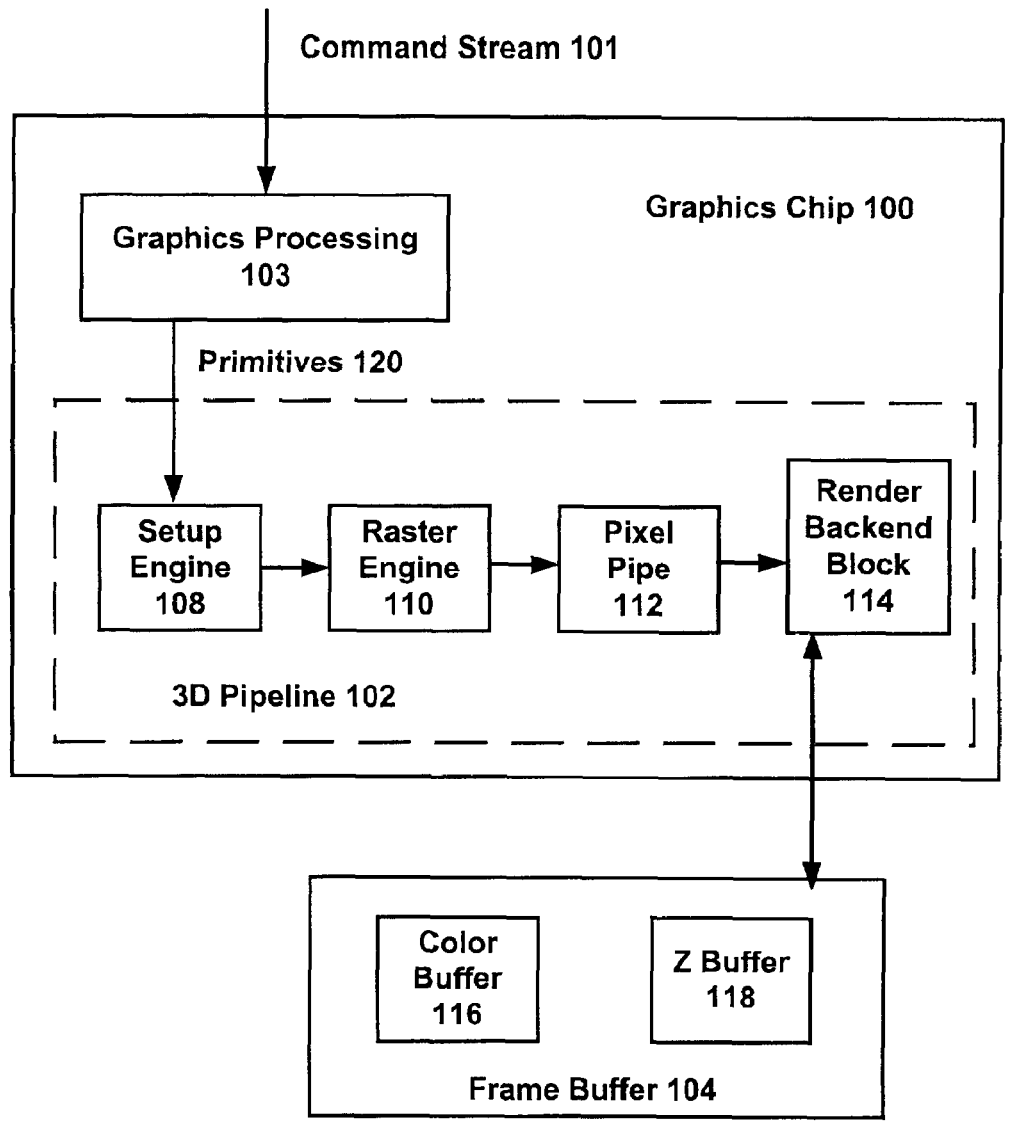
FIG. 1 is a block diagram depicting in general a graphic processing chip and a frame buffer of the prior art.

FIG. 1 depicts a prior art graphics processing system. A graphics chip 100 receives a command stream 101, which is processed by a graphics processing block 103. From the graphics processing block 103 a 3D pipeline 102 receives primitives 120 of image data. The 3D pipeline 102 is operatively connected to the frame buffer 104. 3D pipeline 102 preferably includes a setup engine 108, a raster engine 110, a pixel pipe 112 and a render backend block 114. Frame buffer 104 has at least a color buffer 116 and a z buffer 118. The color buffer 116 stores color information corresponding to pixels in a display frame of the frame buffer 104, and the z buffer 118 stores corresponding z values for the pixels in the display frame of the frame buffer 104.

The setup engine 108 produces information based on graphic primitives 120. The graphic primitives 120 are triangle primitives, which are commonly used in video-graphics operations. Slope information corresponding to these primitives is provided to the raster engine 110 which is operatively connected to the setup engine 108. The raster engine 110 generates pixel fragments from the primitive slope information. Preferably, each pixel fragment includes a color value, a set of coordinates indicating the pixel in a display frame to which the fragment corresponds, an alpha value indicating the degree of transparency, and a z value indicating depth.

The raster engine 110 provides the pixel fragments to the pixel pipe 112, which is operatively connected to the raster engine 110. The pixel pipe 112 performs various operations that may modify the color of the pixel fragment as received from the raster engine 110. Such operations can include texture mapping operations. Fragments resulting from the operation performed by pixel pipe 112 are then passed to the render backend block 114 which is operatively connected to the frame buffer 104. Primitive backend block 114 blends fragments with corresponding pixels in the frame buffer 104 as determined by a set of coordinates for each fragment. The z value for each fragment is used to blend the fragment with the currently stored pixel information. After all resulting pixel information is stored in the frame buffer 104, frame buffer 104 can be accessed by display hardware to retrieve pixel information for generating a display stream for displaying in an image on a display. The color values for the pixels are stored in the color buffer 116 of the frame buffer 104.

Figure 2:
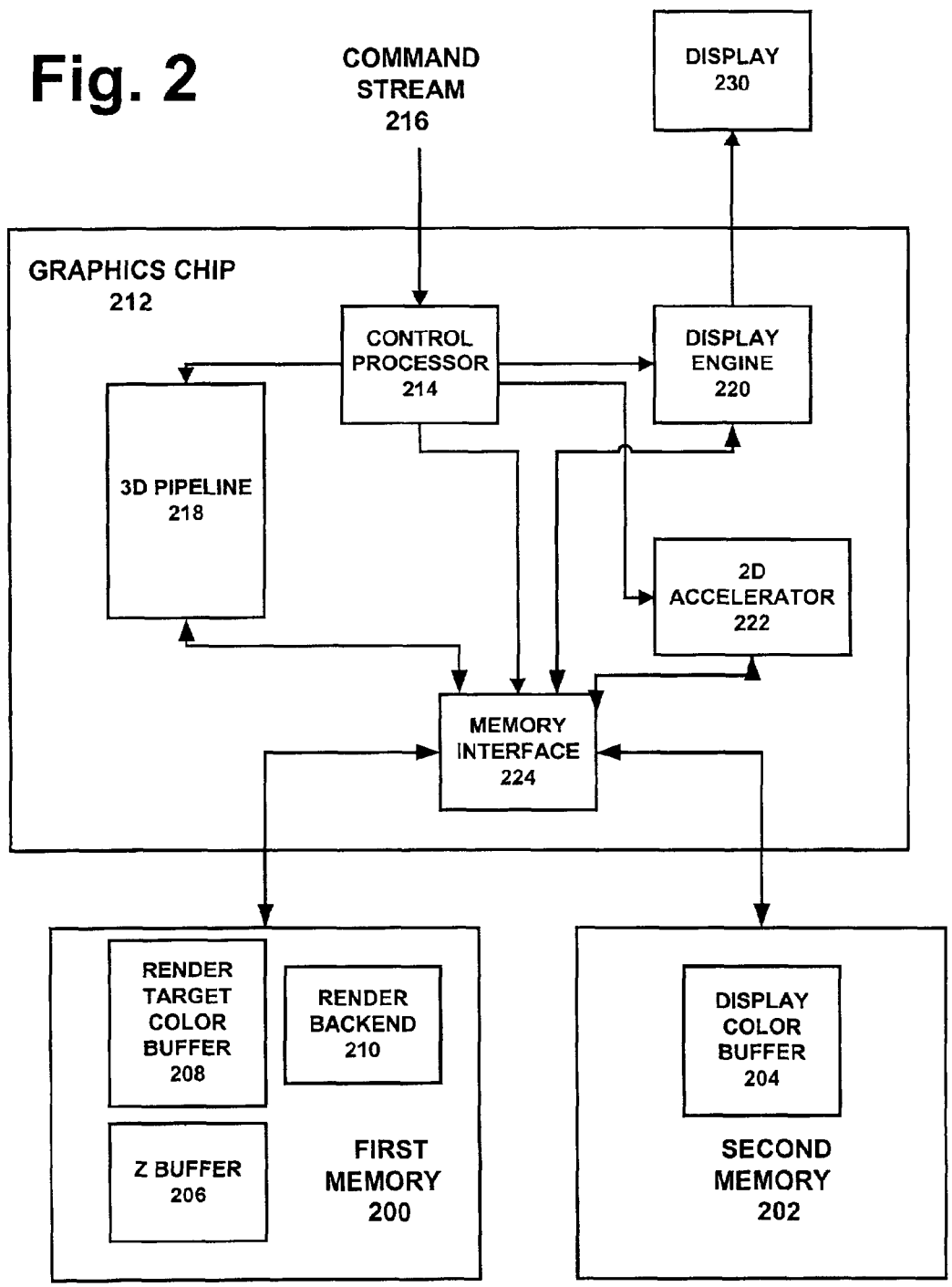
FIG. 2 is a general block diagram depicting the memory system of the present invention.

FIG. 2 depicts the inventive memory system of the present invention which has a first memory 200 and a second memory 202. The first memory 200 stores a render target color buffer 208, which is also termed a back color buffer and a Z buffer 206, while the second memory 202 stores a display color buffer 204, which is a front color buffer. During operation of the computer system, the computer system renders image data to the first memory 200, which has higher bandwidth, and then copies the image data to the second memory 202, which has a lower bandwidth. The display engine 220 takes the image data from the second memory 202. Also, textures can be stored in the display color buffer 204. This results in fast and efficient operation of the computer system in displaying images, without using all high bandwidth memory. Since high bandwidth memory is more costly than low bandwidth memory, the computer system realizes a monetary saving over prior art systems.

The second memory 202 is a conventional DRAM memory, which contains the display color buffer 204 of the frame buffer as is known in the art. The first memory 200 contains the Z buffer 206 and the render target color buffer 208. As depicted in FIG. 2, the first memory 200 is a logic enhanced memory which also contains the render backend logic 210. It should be understood that the render backend logic 210 can also be contained on the graphic chip 212. Thus, the first memory 200 contains the Z data and the color data, whereas the second memory 202 contains all other data in buffer 104 relating to the frame buffer image. The render target color buffer 208 and the Z buffer 206 is where graphic primitives are rendered. The display color buffer 204 is not rendered to, but this buffer provides the pixels that are sent to the display 230.

As further depicted in FIG. 2, a central processor 214 receives the command stream 216 and is operatively connected to a 3D pipeline 218, a display engine 220, a 2D acceleration engine 222, and a memory interface 224. The memory interface 224 is operatively connected to the first memory 200, as well as to the second memory 202.

The memory interface 224 stores data in the second memory 202 except for Z data which is stored in the Z buffer 206 of the first memory 200 and color data which is stored in the render target color buffer 208 of the first memory 200. An increase in bandwidth and thus speed occurs because the memory interface 224 writes to and reads from the Z buffer 206, but only writes to the render target color buffer 208. Thus, the memory interface 224 at this stage does not need to read from the render target color buffer 208. The display engine 220 receives data from the second memory 202 for display on a display 230. After an image is formed in the frame buffer, the display engine 220 processes the information for display on the display 230 as is known in the art.

Figure 3:
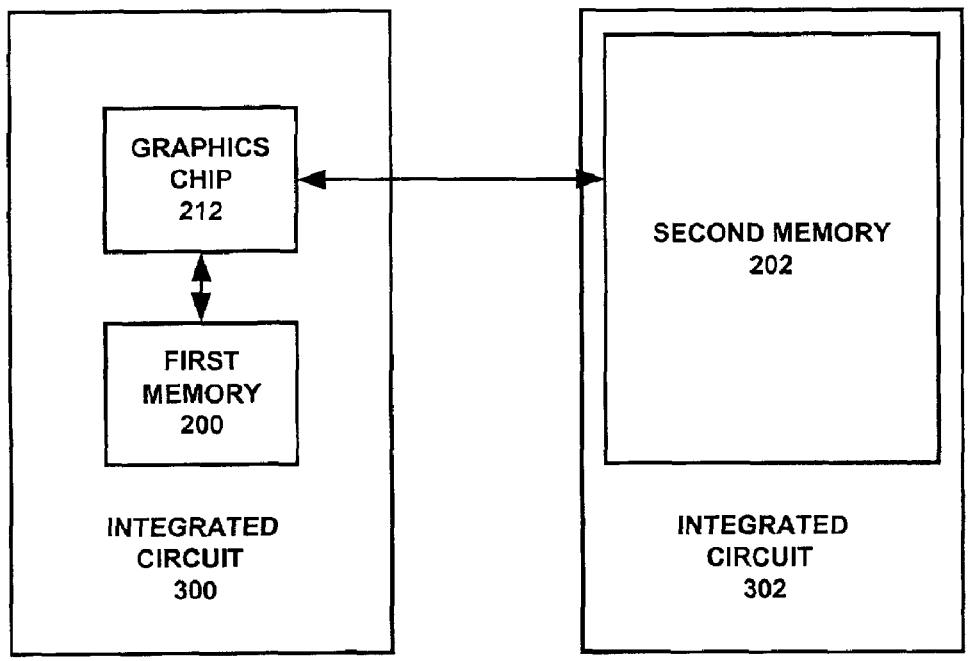
FIG. 3 is a block diagram depicting one memory of the memory system being integrated on a common chip with the graphics processing system.
Figure 4:
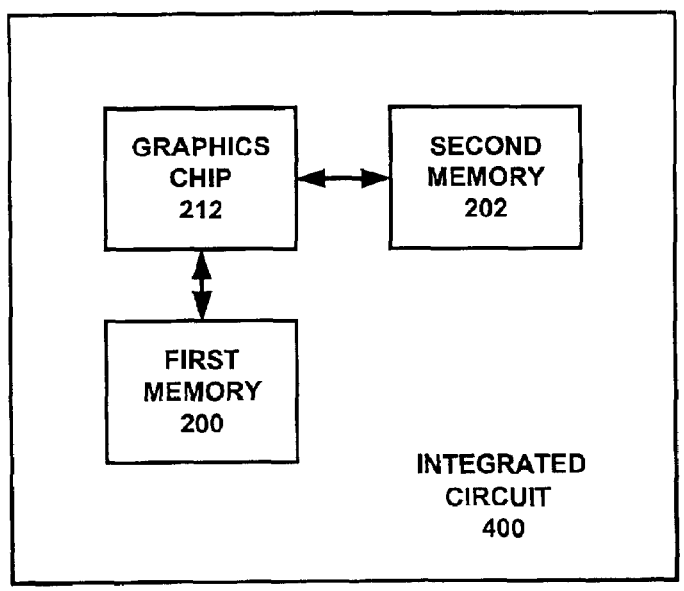
FIG. 4 depicts the memory system being integrated on a common chip with the graphics processing system.

FIG. 2 depicts separate integrated circuits for the graphic chip 212, first memory 200 and the second memory 202. Also, it has been pointed out that the render backend logic 210 could be integrated onto the chip with the first memory 200 or onto the graphics chip 212. FIG. 3 shows an alternative in which the graphics chip 212 has been integrated with the first memory 200 onto a common chip 300 which is operatively connected to the second memory on a separate chip 302. FIG. 4 depicts each of the graphics chip 212, the first memory 200 and the second memory 202 being integrated onto a common chip 400.

Thus, the present invention overcomes the drawbacks of the prior art in that only high bandwidth memory is used only for the render target color buffer and the Z buffer. Low bandwidth memory is used for the display color buffer. This results in significant savings, since high bandwidth memory can cost upwards to three times as much as low bandwidth memory. In one example of the present invention, 16 megabytes of memory is required for the first memory 200 and 48 megabytes of memory is required for the second memory 202. Thus, the present invention provides significant cost savings without sacrificing performance.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A graphics display system, comprising:
   a graphics processor system for forming a color image on a display, the display being composed of an array of pixels;
   a memory system having a first memory for storing at least respective color data and respective Z data rendered from primitives of the image, and a second memory for storing respective display data, which is formed from the color data and Z data, for each of the pixels;
   wherein the first memory has a higher bandwidth than a bandwidth of the second memory;
   the graphics processor system having a memory interface operatively connected to the first and second memories; and
   wherein the first memory is a logic enhanced dynamic random access memory that includes at least render backend logic.

2. The system according to claim 1, wherein the graphics processor, the first memory and the second memory are respectively integrated on three separate chips.

3. The system according to claim 1, wherein the graphics processor, the first memory and the second memory are respectively integrated onto a common chip.

4. The system according to claim 1, wherein the graphics processor and the first memory are integrated onto a first chip, and wherein the second memory is integrated onto a second chip.

5. The system according to claim 1, wherein the graphics processor and the memory interface are integrated on a common chip.

6. The system according to claim 1, wherein the first memory is a dynamic random access memory (DRAM).

7. The system according to claim 1, wherein the second memory is a dynamic random access memory (DRAM).

8. The system according to claim 1, wherein each of the first and second memories is a dynamic random access memory (DRAM).

9. The system according to claim 1, wherein the first memory includes a render target color buffer for storing at least respective color data rendered from primitives of the image, after primitives are rendered to the target render color buffer and the Z buffer, image data in the first memory is copied to the second memory to form display data in the display color buffer in the second memory.

10. A graphics display system, comprising:
a graphics processor for forming a color image on a display, the display being composed of an array of pixels;
a logic enhanced DRAM memory for storing at least respective color data and respective Z data rendered from primitives of the image, and having at least render backend logic, the logic enhanced DRAM memory being a first memory;
a further DRAM memory for storing respective display data, which is formed from at least the color data and Z data, for each of the pixels, the further DRAM memory being a second memory;
wherein the first memory has a higher bandwidth than a bandwidth of the second memory; and
the graphics processor having a memory interface operatively connected to the logic enhanced DRAM memory and to the further DRAM memory.

11. The system according to claim 10, wherein the graphics processor, the first memory and the second memory are respectively integrated on three separate chips.

12. The system according to claim 10, wherein the graphics processor, the first memory and the second memory are respectively integrated onto a common chip.

13. The system according to claim 10, wherein the graphics processor and the first memory are integrated onto a first chip, and wherein the second memory is integrated onto a second chip.

14. The system according to claim 10, wherein the graphics processor and the memory interface are integrated on a common chip.

15. The system according to claim 10, wherein, during formation of an image frame, the memory interface writes to and reads from the z buffer and the color buffer.

16. The system according to claim 10, wherein the first memory includes a render target color buffer for storing at least respective color data rendered from primitives of the image, after primitives are rendered to the target render color buffer and the Z buffer, image data in the first memory is copied to the second memory to form display data in the display color buffer in the second memory.

17. A graphics display system, comprising:
a graphics processor system for forming a color image on a display, the display being composed of an array of pixels;
a memory system coupled to the graphics processor system, the memory system having a first memory, the first memory having a target render color buffer for storing at least respective color data rendered from primitives of the image, and a Z buffer for storing respective Z data rendered from primitives of the image, wherein the first memory has a higher bandwidth than a bandwidth of the second memory, and the memory system having a second memory having a display color buffer for storing respective display data, which is formed from the color data and Z data, for each of the pixels of the display; and
the graphics processor system having a memory interface operatively connected to the first and second memories; and
during formation of an image frame, the memory interface writes to and reads from the Z buffer, and only writes to the render target color buffer.

18. The system according to claim 17, wherein the second memory is approximately three times larger than the first memory.

19. The system according to claim 17, wherein the graphics processor, the first memory and the second memory are respectively integrated on three separate chips.

20. The system according to claim 17, wherein the graphics processor, the first memory and the second memory are respectively integrated onto a common chip.

21. The system according to claim 17, wherein the graphics processor and the first memory are integrated onto a first chip, and wherein the second memory is integrated onto a second chip.

22. The system according to claim 17, wherein the graphics processor and the memory interface are integrated on a common chip.

23. The system according to claim 17, wherein the first memory is a dynamic random access memory (DRAM).

24. The system according to claim 17, wherein the first memory is a logic enhanced dynamic random access memory that includes at least render backend logic.

25. The system according to claim 17, wherein the second memory is a dynamic random access memory (DRAM).

26. The system according to claim 17, wherein each of the first and second memories is a dynamic random access memory (DRAM).

27. The system according to claim 17, wherein, after primitives are rendered to the target render color buffer and the Z buffer, image data in the first memory is copied to the second memory to form display data in the display color buffer in the second memory.

* * * * *